United States Patent [19]

Takahashi

[11] Patent Number: 5,466,145
[45] Date of Patent: Nov. 14, 1995

[54] DISC BASE BOARD MOLDING DIE INCLUDING STAMPER PLATE ATTACHING/DETACHING DEVICE

[75] Inventor: Mitsuo Takahashi, Matsudo, Japan

[73] Assignee: Seikoh Giken Co., Ltd., Matsudo, Japan

[21] Appl. No.: 213,574

[22] Filed: Mar. 16, 1994

[30] Foreign Application Priority Data

Apr. 23, 1993 [JP] Japan .................................. 5-120464

[51] Int. Cl.⁶ ........................................... B29C 45/00
[52] U.S. Cl. .................... 425/190; 264/107; 425/191; 425/192 R; 425/810
[58] Field of Search ..................... 425/190, 191, 425/192 R, 810; 264/106, 107

[56] References Cited

U.S. PATENT DOCUMENTS

| 4,623,319 | 11/1986 | Zaruba et al. | 425/190 |
| 4,737,096 | 4/1988 | Poorten | 425/190 |
| 5,116,210 | 5/1992 | Watanabe et al. | 425/810 |

FOREIGN PATENT DOCUMENTS 2-295726  6/1990  Japan .

*Primary Examiner*—Tim Heitbrink

*Attorney, Agent, or Firm*—Spencer, Frank & Schneider

[57] ABSTRACT

To injection-mold a base board for an optical disc or the like, an injection molding die includes a stamper plate attaching/detaching device installed therein. The stamper attaching/detaching device includes as essential components a stamper plate attaching/detaching bush adapted to be fitted into a tapered bush fitting hole formed in a die half on the movable side together with a stamper plate to be firmly placed on a die cavity, an actuating rod having a pinion gear formed at the fore end part thereof to mesh with a rack formed at the lower end part of the stamper plate attaching/detaching bush, and a lock nut for immovably hold the actuating rod during a series of molding operations. The stamper plate is removably fitted around the outer periphery of a flange portion of the stamper plate attaching/detaching bush. As the actuating rod is rotated by actuating a knob with an operator's hand, the stamper plate attaching/detaching bush is quickly linearly displaced in the die half on the movable side in the upward/downward direction via meshing engagement of the pinion gear of the actuating rod with the rack of the stamper plate attaching/detaching bush. To linearly displace the stamper plate attaching/detaching bush in the upward/downward direction, a pair of actuating rods each extending in parallel with each other may be arranged in the symmetrical relationship relative to the center axis of the stamper plate attaching/detaching bush.

11 Claims, 3 Drawing Sheets

(L)  (R)

(L)  (R)

(L)  (R)

DISC BASE BOARD MOLDING DIE INCLUDING STAMPER PLATE ATTACHING/DETACHING DEVICE

BACKGROUND OF THE INVENTION

1. Field of the Invention

The present invention relates generally to a disc base board molding die including a stamper plate attaching/ detaching device. More particularly, the present invention relates to an improvement of an injection molding die of the foregoing type which ensures that the working stroke of a stamper plate attaching/detaching bush can be enlarged in the axial direction at the time of attachment/detachment of the stamper plate attaching/detaching bush, and moreover, a volume occupied by an actuating mechanism installed in the disc base board molding die can be minimized.

2. Description of the Prior Art

To facilitate understanding of the present invention, a typical conventional stamper plate attaching/detaching device installed in a disc base .board molding die will briefly be described below with reference to FIG. 3 and FIG. 4, each of which shows by way of example problems inherent to the conventional stamper plate attaching/detaching device.

FIG. 3 is a conventional stamper plate attaching/detaching device installed in a disc base board molding die, particularly showing a mode of operation of the stamper plate attaching/detaching device. Specifically, FIG. 3(L) shows by way of sectional view the operative state of the stamper plate attaching/detaching device wherein a stamper plate is firmly placed on the die cavity of a lower die half of the disc base board molding die, and FIG. 3(R) shows by way of sectional view the operative state of the stamper plate attaching/ detaching device directly before the stamper plate is detached from the lower die half. The structure of the stamper plate attaching/detaching device is disclosed in an official gazette of Japanese Patent Laid-Open Publication NO. 2-60502.

As is best seen in FIG. 3(R), the stamper plate 2 is firmly attached around the outer periphery of a flange portion of a stamper plate attaching/detaching bush (hereinafter referred to simply as a bush) 3 in such a manlier that the stamper plate is snapped below the flange portion of the bush 3. Subsequently, the bush 3 is received in a tapered bush fitting hole 4.

A key slot 5 is formed in a cylindrical portion of the lower die half 1 located below the bush/fitting hole 4 for the purpose of preventing the bush 3 from being rotated during each stamper plate attaching/detaching operation, i.e., for the purpose of allowing the bush 3 to be linearly displaced in the upward/downward direction. A plurality of female threads 10 are formed around the outer periphery of a cylindrical hole formed in a die plate 7 below the key slot 5 so as to come in threadable engagement with the male threads 6 on the bush 3.

The die plate 7 is integrated with the lower die half 1, and a key 8 is projected to enter the key slot 5 for the foregoing purpose. In addition, a face gear 9, disposed below a cylindrical portion of the die plate 7, has a plurality of gear teeth formed along the lower surface thereof. A plurality of female threads 10 are formed around the inner periphery of the face gear 9 to come in threadable engagement with a plurality of male threads 6 formed around the outer peripheral surface of the bush 3 at the lower part of the latter.

To actuate an assembly of the bush 3 and the face gear 9, an actuating rod 11 is horizontally arranged in the die plate 7, and a pinion gear 12 is formed at the fore end part of the actuating rod 11 to come in meshing engagement with the face gear 9.

Attachment of the stamper plate 2 to the lower die half 1 is achieved in the following manner.

The stamper plate 2 is first fitted around the flange portion of the bush 3. The bush 3 is then received in the tapered bush fitting hole 4, and thereafter, the key 8 is projected in the key slot 8 so as to prevent the bush 3 from being rotated. Subsequently, an operator rotates the actuating rod 11 with his hand to rotate the face gear 9 via the pinion gear 12, causing the bush 3 to be forcibly displaced in the downward direction via threadable engagement of the male threads 6 of the bush 3 with the female threads 10 of the face gear 9 without any rotation of the bush 3. On completion of the downward displacement of the bush 3, as shown in FIG. 3(L), the stamper plate 2 comes in close contact with the upper surface of the lower die half 1.

Next, detachment of the stamper plate 2 from the lower die half 1 will be described below.

The operator rotates the actuating rod 11 with his land in the reverse direction so as to rotate the face gear 9 in the reverse direction via the pinion gear 12, causing the bush 3 to be forcibly displaced in the upward direction, whereby the stamper plate 2 is detached away from the lower die half 1.

An advantageous effect of the stamper plate attaching/ detaching device constructed in the above-described manner consists in that the bush 3 is designed to have a large working stroke $H_1$ as seen in the vertical direction, resulting in the bush 3 being safely detached from the lower die half 1 together with the stamper plate 2.

However, the stamper plate attaching/detaching device has a drawback in that the assembly of the face gear 9 and the pinion gear 12 occupies a large space in the die assembly on the movable side (consisting of the lower die half 1 and the die plate 7 in the illustrated case), causing die cooling circuits (not shown) to be restrictively formed in the die assembly on the movable side. Consequently, the whole structure of the disc base board molding die unavoidably becomes large in size. Another drawback is such that the actuating rod 11 is rotated by a large number of revolutions, causing each stamper plate attaching/detaching operation to be achieved in a long period of time.

For example, in the case where a gear ratio of the pinion gear 12 to the face gear 9 is set to 1:7, a pitch of each of the male threads 6 and the female threads 10 is set to 0.75 mm and the working stroke $H_1$ of the bush 3 is set to 15 mm, it is necessary that the actuating rod 11 be rotated by 140 revolutions for achieving each stamper plate attaching/ detaching operation. This means that it is practically difficult to manually rotate the actuating rod 11 with an operator's hand during the complete stamper plate attaching/detaching operation.

FIG. 4 is a sectional view of another conventional stamper plate attaching/detaching device installed in a disc base board molding die of which a patent application was filed by a common applicant to the present invention and has been laid open under Japanese Patent Laid-Open Publication NO. 2-295726.

The stamper plate attaching/detaching device includes a stamper plate attaching/detaching bush (hereinafter referred to simply as a bush) 13 of which the lower end part is designed in the form of a flange portion, and a stepped part 14 is formed around the flange portion of the bush 13. A lower die half 1 of the disc base board molding die is integrated with a die plate 15 through which two actuating rods 16 are inserted, and a part of the foremost end of each actuating rod 16 is cut out to form a flat plane portion 17 having a semicircular sectional shape.

Attachment of a stamper plate 2 to the lower die half 1 will be described below with reference to FIG. 4.

First, the stamper plate 2 is fitted around the outer periphery of the bush 13 and under a flange portion of the same, and the bush 13 is then provisionally inserted into a tapered fitting hole 4.

Prior to the provisionally insertion of the bush 13, the flat plane portion 17 of each actuating rod 16 is caused to extend past the axis line of the actuating rod 16 in the horizontal direction (see FIG. 4(L)), and thereafter, the left-hand actuating rod 16 is turned in the clockwise direction and the right-hand actuating rod 16 is turned in the anticlockwise direction so that the flat plane portions 17 are engaged with the stepped part of the bush 13, causing the bush 13 to be forcibly displaced ill the downward direction until the stamper plate 2 is brought in close contact with the upper surface of the lower die half 1.

Detachment of the stamper plate 2 from the lower die half 1 is achieved in such a manner that the left-hand actuating rod 16 is turned in the anticlockwise direction and the right-hand actuating rod 16 is turned in the clockwise direction, causing the bush 3 to be displaced by outer edge portions 18 of both actuating rods 16 in the upward direction (see FIG. 4(R)).

All advantageous effect of the stamper plate attaching/detaching device constructed in the above-described manner consists in that each attaching/detaching operation can be achieved merely by a turning movement of both actuating rods 17 by an angle of about 180 degrees so that the actuating mechanism is designed with a simple structure while occupying a minimized space in the die assembly on the movable side, resulting in the disc base board molding die being designed with an increased degree of design freedom and with small dimensions.

However, the stamper plate attaching/detaching device has a drawback that a working stroke $H_2$ of the bush 13 is limited merely to about ⅔ of the outer diameter of each actuating rod 16, causing the detachment of the stamper plate 2 from the lower die half 1 to be achieved with some difficulty. For example, in the case where each actuating rod 16 has an outer diameter of 10 mm, the working stroke $H_2$ of the bush 13 is set to a small value of only about 7 mm.

To ensure that the bush 13 is safely detached from the lower die half 1 together with the stamper plate 2, it is hitherto required that the working stroke of the bush 13 be set to about 15 mm or more.

SUMMARY OF THE INVENTION

The present invention has been made in consideration of the aforementioned background.

An object of the present invention is to provide a disc base board molding die including a stamper plate attaching/detaching device wherein the working stroke of a stamper plate attaching/detaching bush of the stamper plate attaching/detaching device in the axial direction can be enlarged merely with a necessity for rotating an actuating rod by an angle smaller than one revolution while the space occupied by an actuating mechanism installed in the disc base board molding die for rotating the actuating rod and a lock nut is minimized.

Another object of the present invention is to provide a disc base board molding die including a stamper plate attaching/detaching device wherein the actuating rod and the lock nut are not undesirably loosened during a series of molding operations.

According to one aspect of the present invention, there is provided a disc base board molding die including a stamper plate attaching/detaching device wherein a stamper plate is firmly placed on a die cavity having a sectional shape corresponding to a disc base board to be molded in one of a die assembly on the stationary side and a die assembly on the movable side so that each disc base board is molded by injecting a molten synthetic resin into the die cavity, wherein the stamper plate attaching/detaching device includes a stamper plate attaching/detaching bush to be linearly received in and removed from a bush fitting hole formed in one of a die half on the stationary side and a die half on the movable side, the stamper plate attaching/detaching bush including a flange portion at one end part of the stamper plate attaching/detaching bush for immovably holding the stamper plate around the outer periphery thereof and a rack having a plurality of annular gear teeth formed therearound at the other end part of the stamper plate attaching/detaching bush; an actuating rod arranged in the tangential relationship relative to the center axis of the stamper plate attaching/detaching bush for linearly displacing the stamper plate attaching/detaching bush by rotating the actuating rod with an operator's hand, the actuating rod including a pinion gear at the fore end part thereof to mesh with the rack of the stamper plate attaching/detaching bush; and a lock nut having a plurality of female threads formed therein for immovably holding the actuating rod during a series of molding operations.

To ensure that the actuating rod is rotated for linearly displacing the stamper plate attaching/detaching bush in the upward/downward direction, an insert guiding hole is formed in a die plate integrated with the die half at a right angle relative to the center axis of the stamper plate attaching/detaching bush while extending tangentially relative to the outer peripheral surface of the stamper plate attaching/detaching bush so as to allow the actuating rod to be slidably displaced in the insert guiding hole as the actuating rod is rotated with an operator's hand, and a plurality of female threads are formed around the inner wall of the insert guiding hole on the inlet side of the latter.

A plurality of male threads are formed around the actuating rod in the region substantially corresponding to the females threads of the insert guiding hole and the female threads of the lock nut.

A part of the male threads of the actuating rod cooperates with the male threads of the insert guiding hole so as to slidably displace the actuating rod in the insert guiding hole as the actuating rod is rotated with an operator's hand, while the other part of the male threads of the actuating rod cooperates with the female threads of the lock nut so as to immovably holding the actuating rod during a series of molding operations.

For example, a knob to be seized with an operator's hand is fixedly secured to the foremost end of the actuating rod so as to rotate the latter therewith.

According to other aspect of the present invention, there is provided a disc base board molding die including a stamper plate attaching/detaching device wherein a stamper plate is firmly placed oil a die cavity having a sectional shape corresponding to a disc base board to be molded in one of a die assembly on the stationary side and a die assembly on the movable side so that each disc base board is molded by injecting a molten synthetic resin into the die cavity, wherein the stamper plate attaching/detaching device includes a stamper plate attaching/detaching bush to be linearly received in and removed from a bush fitting hole formed in one of a die half on the stationary side and a die half on the movable side, the stamper plate attaching/ detaching bush including a flange portion formed at one end part of the stamper plate attaching/detaching bush for immovably holding the stamper plate around the outer periphery thereof and a rack having a plurality of annular gear teeth formed thereabout at the other end part of the stamper plate attaching/detaching bush; a pair of actuating rods arranged in the tangential relationship relative to the stamper plate attaching/detaching bush while extending in parallel with each other for linearly displacing the stamper plate attaching/detaching bush by rotating one of the actuating rods with an operator's hand, each of the actuating rods including a pinion gear at the fore end part thereof to mesh with the rack of the stamper plate attaching/detaching bush; and a lock nut having a plurality of female threads formed therein for immovably holding one of the actuating rods during a series of molding operations.

The actuating rods are operatively connected to each other via a pair of gears located outside of the lock nut so that they are rotated in the opposite direction relative to each other as one of the actuating rods is rotated with an operator's hand.

A pair of insert guiding holes each extending in parallel with each other are formed in a die plate integrated with the die half at a right angle relative to the center axis of the stamper plate attaching/detaching bush while extending tangentially relative to the outer peripheral surface of the stamper plate attaching/detaching bush so as to allow the actuating rods to be slidably displaced in the insert guiding holes as one of the actuating rods is rotated with an operator's hand.

A plurality of male threads are formed around each actuating rod in the region substantially corresponding to the female threads of each insert guiding hole and the female threads of the lock nut.

A plurality of male threads of one of the actuating rods and a plurality of female threads of one of the insert guiding holes spirally extend in the opposite direction relative to a plurality of male threads of the other one of the actuating rods and a plurality of female threads of the other one of the insert guiding holes.

To ensure that the actuating rods are simultaneously rotated in the opposite direction with the aid of the gears meshing with each other, it is desirable that a knob (to be seized with an operator's hand) is fixedly secured to the foremost end of one of the actuating rods.

Other objects, features and advantages of the present invention will become apparent from a reading of the following description which has been made in conjunction with the accompanying drawings.

BRIEF DESCRIPTION OF THE DRAWINGS

The present invention is illustrated in the following drawings in which.

DESCRIPTION OF THE PREFERRED EMBODIMENT

The present invention will now be described in detail hereinafter with reference to the accompanying drawings which illustrate a preferred embodiment thereof.

Figure 1:
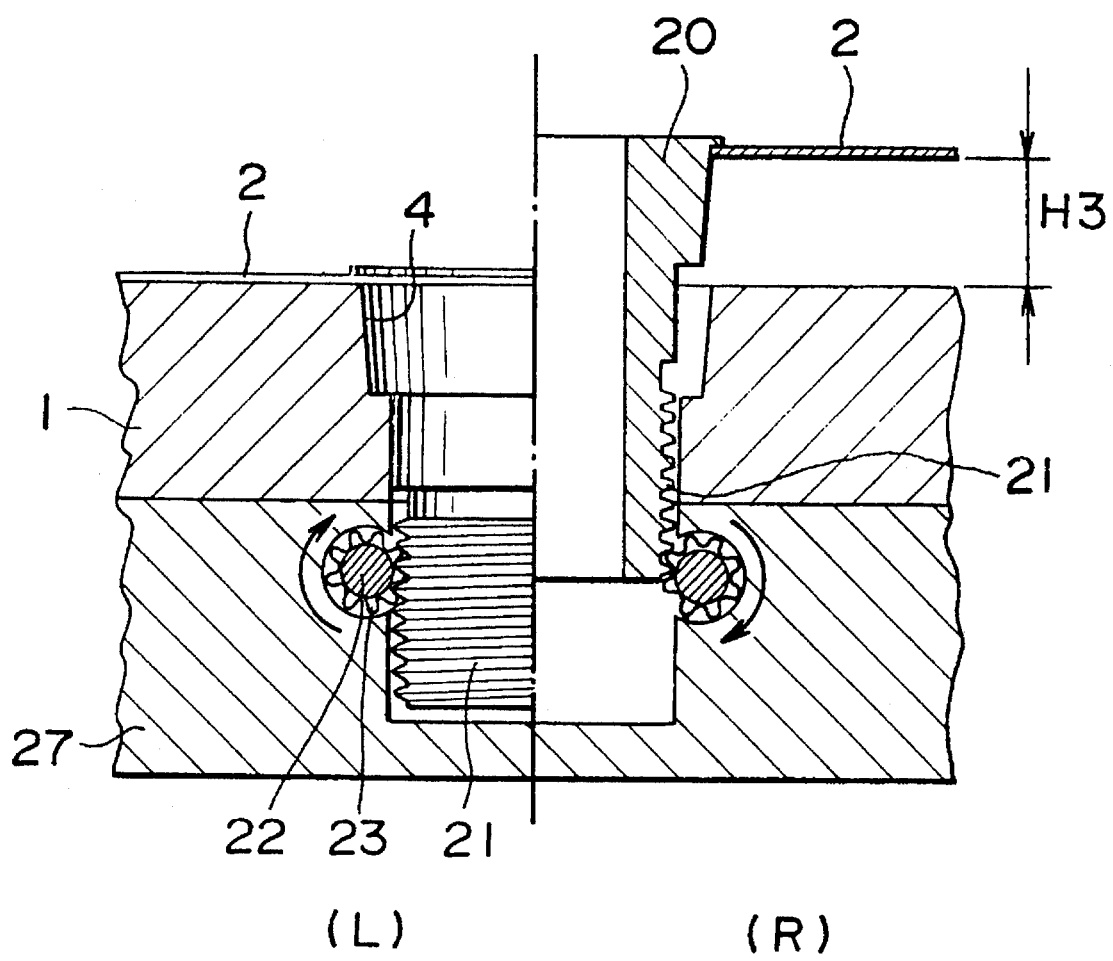
FIG. 1 is a fragmentary sectional view of a disc base board molding die including a stamper plate attaching/detaching device constructed according to an embodiment of the present invention.
Figure 2:
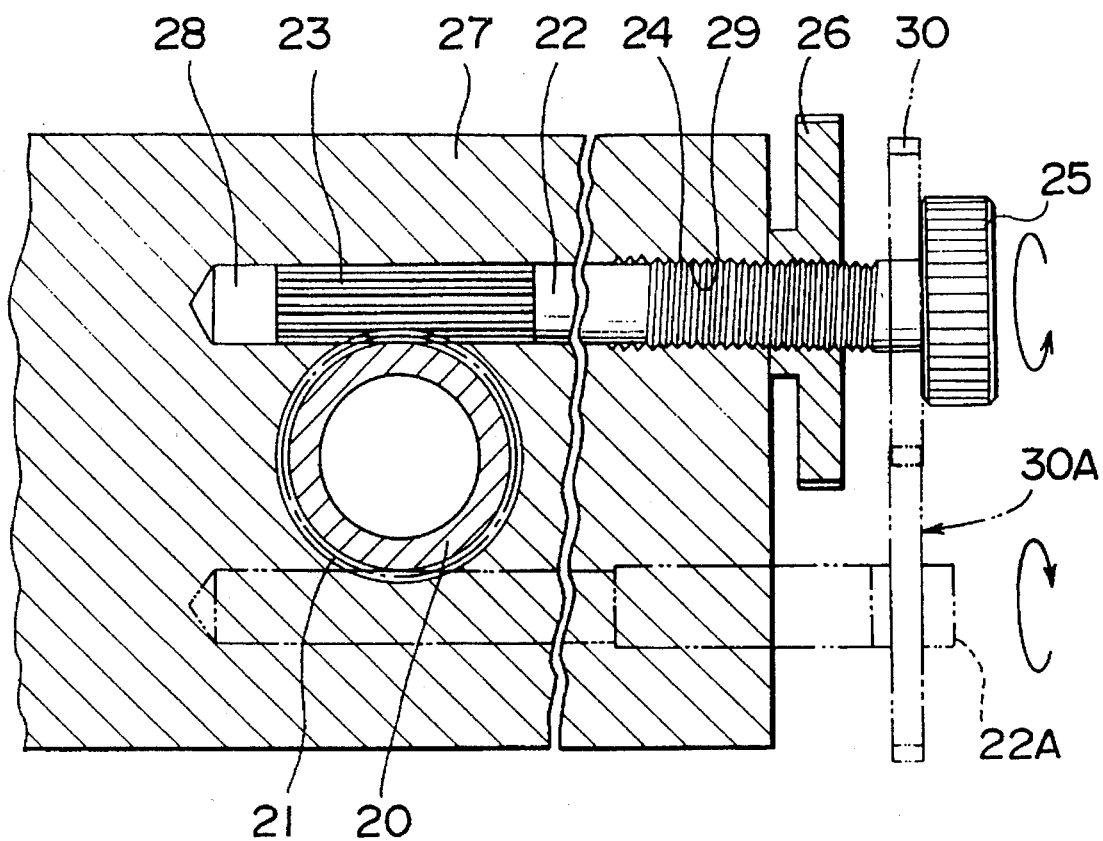
FIG. 2 is a fragmentary plan view of the disc base board molding die shown in FIG. 1.

FIG. 1 and FIG. 2 show by way of sectional views the structure of a stamper plate attaching/detaching device for a disc base board molding die constructed according to the embodiment of the present invention. Specifically, FIG. 1(L) shows by way of sectional view a left half of the stamper plate attaching/detaching device wherein a stamper plate 2 is firmly attached to the upper surface of a lower die half 1, and FIG. 1(R) shows by way of sectional view a right half of the stamper plate attaching/detaching device wherein the stamper plate 2 is detached from the upper surface of the lower die half 1 before it is removed from a stamper plate attaching/detaching bush (hereinafter referred to simply as a bush) 20.

Figure 3:
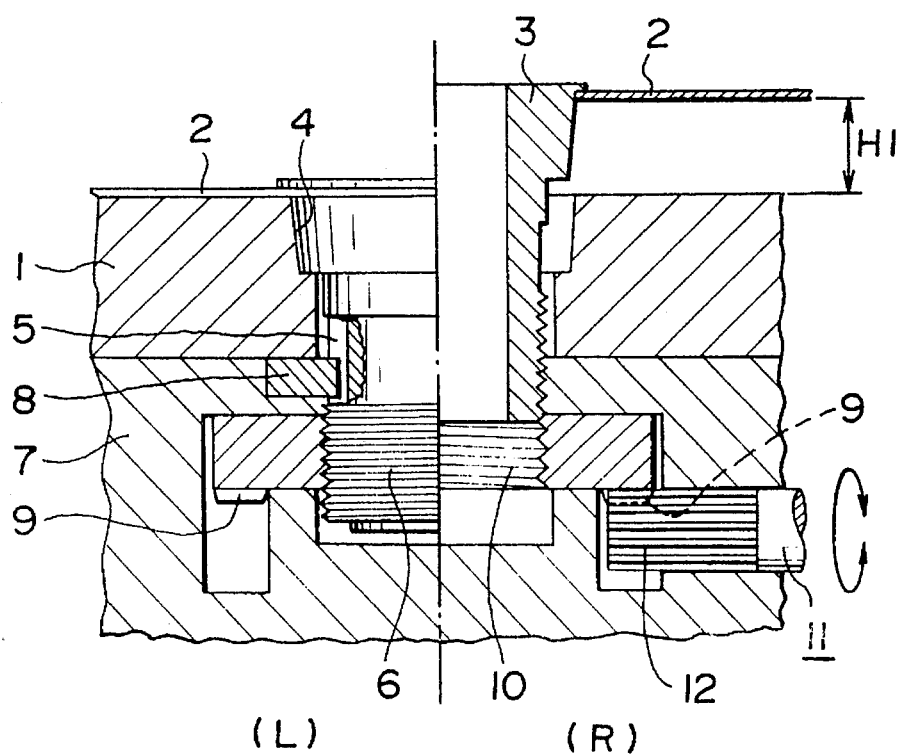
FIG. 3 is a fragmentary sectional view of a disc base board molding die including a conventional stamper plate attaching/detaching device, particularly showing a mode of operation of the stamper plate attaching/detaching device.
Figure 4:
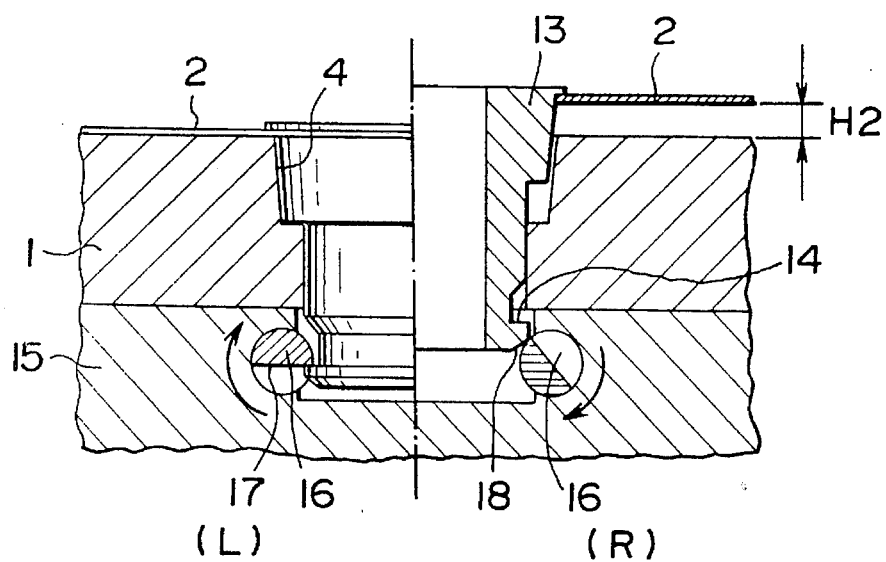
FIG. 4 is a fragmentary sectional view of the disc base board molding die including another conventional stamper plate attaching/detaching device.

The lower die half 1 is integrated with a die plate 27, and a tapered fitting hole 4 is formed through the lower die half 1. The stamper plate 2 is fitted around the outer periphery of a flange portion of the bush 3 in the same manner as the conventional stamper plate attaching/detaching device described above with reference to FIG. 3 and FIG. 4.

The bush 20 includes a flange portion for retaining the stamper plate 2 around the lower end thereof, a cylindrical engagement portion around which the stamper plate 2 is firmly fitted, a tapered cylindrical surface contoured corresponding to the tapered fitting hole 4, a cylindrical portion to be exactly fitted into a through hole formed in the lower die half 1, and a rack 21 having a plurality of annular gear teeth formed thereabout. In addition, the stamper plate attaching/detaching device includes an actuating rod 22. A pinion gear 23 is formed at the fore end part of the actuating rod 22 so as to mesh with the rack 21 when the actuating rod 22 is inserted through an insert guiding hole 28 extending at a right angle relative to the axis line of the bush 20. A plurality of male threads 24 are formed around the intermediate part of the actuating rod 22, and a knob 25 is fixedly secured to the outermost end of the same. Further, a plurality of female threads 29 are formed in a part of the insert guide hole 28 located adjacent to the right-hand end of the die plate 27.

The male threads 24 on the actuating rod 22 are threadably engaged with the female threads 29 of the insert guiding hole 28, and a lock nut 26 is threadably engaged with the male threads 24 for firmly holding the actuating rod 22 during a series of molding operations.

Attachment of the stamper plate 2 to the lower die half 1 is achieved in the following manner.

First, the lock nut 26 is loosened from the fixed state by rotating it with an operator's hand. The stamper plate 2 is then fitted around the outer periphery of the flange portion of the bush 20, and thereafter, the bush 20 is provisionally received in the tapered fitting hole 4.

At this time, the pinion gear 23 of the actuating rod 22 is brought in meshing engagement with the rack 21, and thereafter, the actuating rod 22 is rotated with the knob 25 in the clockwise direction so as to allow the bush 20 to be linearly displaced in the downward direction until the stamper plate 2 is brought in close contact with the upper surface of the lower die half 1 (see FIG. 1(L)).

As the actuating rod 22 is rotated in that way, it is slidably displaced in the insert guiding hole 28 in the leftward/rightward direction due to the threadable engagement of the male threads 24 with the female threads 29. After the bush 20 is completely received in the tapered fitting hole 4, the lock nut 26 is rotated with an operator's hand until it comes in tight contact with the die plate 27. Thus, the actuating rod 22 cannot become loosened during a series of molding operations.

Detachment of the stamper plate 2 from the lower die half 1 is achieved in such a manner that the lock nut 26 is first loosened from the fixed state by rotating the lock nut 26 with the operator's hand. The actuating rod 22 is then rotated in the opposite direction to that of attachment of the stamper plate 2 by rotating the knob 25 with the operator's hand.

As the actuating rod 22 is rotated in that way, the bush 20 is linearly displaced in the upward direction via the meshing engagement of the pinion gear 23 with the rack 22, while the actuating rod 22 is slidably displaced in the insert guiding hole 28 due to the threadable engagement of the male threads 24 with the female threads 29.

FIG. 1(R) shows by way of sectional view the operative state of the stamper plate attaching/detaching device where the bush 20 is raised up to the highest position so that the stamper plate 2 is ready to be removed from the bush 20.

The present invention has been described above with respect to the embodiment wherein a single actuating rod 22 is used for the stamper plate attaching/detaching device. Alternatively, another actuating rod 22A may be arranged at the symmetrical position relative to the actuating rod 22 with the center axis of the bush 2 interposed therebetween.

In this case, it is recommended that a pair of gears 30 and 30A, each having a same number of gear teeth, are fitted onto respective actuating rods 22 and 22A so that the latter are simultaneously rotated in opposite directions relative to each other by rotating the knob 25 with the operator's hand, as represented by phantom lines in FIG. 2. To ensure that both the actuating rods 22 and 22A are simultaneously slidably displaced in the insert guiding holes 28 in the same direction, in the case that the actuating rod 22 has a plurality of right-hand male threads, the actuating rod 22A has a plurality of left-hand male threads.

In this embodiment, for example, in the case that a working stroke of the bush 3 is set to 15 mm, a module of the teeth of rack 21 is set to 0.75, a module of the pinion gear 23 is set to 0.75, the number of teeth of the pinion gear 23 is set to 8, and an outer diameter of the pinion gear 23 is set to 7.5 mm, it is required that the pinion gear be rotated by an angle of 286 degrees, and the actuating rod 22 be rotated by an angle corresponding to about ¾ of one revolution.

An advantageous effect of the present invention is that the stamper plate can easily be exchanged with another one in the narrow state as desired while the disc base board molding die is mounted on an injection molding machine (not shown).

With the disc base board molding die including the stamper plate attaching/detaching bush, it is usually required that a stamper plate attaching/detaching operation and a rotating operation for the actuating rod 22 are manually achieved with an operator's hand. In addition, with the stamper plate attaching/detaching device of the present invention constructed in the above-described manner, since it suffices that the lock nut 26 is loosened from the fixed state and the knob 25 is then rotated with an operator's hand to rotate the actuating rod 22, the foregoing operations can easily be performed with operator's hands.

While the present invention has been described above with respect to a single preferred embodiment thereof, it should of course be understood that the present invention should not be limited only to this embodiment but various changes or modifications may be made without departure from the scope of the invention as defined by the appended claims.

What is claimed is:

1. In a disc base board molding die including a stamper plate attaching and detaching device wherein a stamper plate is firmly placed on a die cavity located in a die assembly, the cavity having a sectional shape corresponding to a disc base board to be molded, each disc base board being molded by injecting a molten synthetic resin into said die cavity, the improvement comprising;

a stamper plate attaching and detaching bush linearly received in and removed from a bush fitting hole formed in one of a stationary die half and a movable die half, said stamper plate attaching and detaching bush including a first end part having a flange portion for removably holding said stamper plate around an outer periphery thereof, and a second opposite end part having a rack, said rack including a plurality of annular gear teeth formed therearound, an actuating rod arranged in a tangential relationship relative to a center axis of said stamper plate attaching and detaching bush for linearly displacing said stamper plate attaching and detaching bush by rotating said actuating rod with an operator's hand, said actuating rod including a pinion gear at an end portion thereof to mesh with said rack of said stamper plate attaching and detaching bush, and a lock nut having a plurality of female threads formed therein for immovably holding said actuating rod during a series of molding operations.

2. The disc base board molding die according to claim 1, further comprising a die plate integrated with said one die half and having an insert guiding hole therein, said insert guiding hole being formed at a right angle relative to the center axis of said stamper plate attaching and detaching bush and extending tangentially relative to the center axis of said stamper plate attaching and detaching bush so as to allow said actuating rod to be slidably displaced in said insert guide hole as said actuating rod is rotated with an operator's hand, and a plurality of female threads are formed around an inner wall on an inlet side of said insert guiding hole.

3. The disc base board molding die according to claim 2, wherein a plurality of male threads are formed around said actuating rod in a region substantially corresponding to said female threads of said insert guiding hole and said female threads of said lock nut.

4. The disc base board molding die according to claim 3, wherein a portion of said male threads of said actuating rod cooperates with said female threads of said insert guiding hole so as to slidably displace said actuating rod in said insert guiding hole as said actuating rod is rotated with an operator's hand, while another portion of said male threads of said actuating rod cooperates with said female threads of said lock nut so as to immovably hold said actuating rod during a series of molding operations.

5. The disc base board molding die according to claim 1, further comprising a knob, to be seized by an operator's hand, fixedly secured to a foremost end of said actuating rod for rotating the actuating rod therewith.

6. In a disc base board molding die including a stamper plate attaching and detaching device wherein a stamper plate is firmly placed on a die cavity located in a die assembly, the cavity having a sectional shape corresponding to a disc base board to be molded, each disc base board being molded by injecting a molten synthetic resin into said die cavity, the improvement comprising;

a stamper plate attaching and detaching bush linearly received in and removed from a bush fitting hole formed in one of a stationary die half and a movable die half, said stamper plate attaching and detaching bush including a first end part having a flange portion formed for removably holding said stamper plate around an outer periphery thereof, and a second opposite end part having a rack, said rack including a plurality of annular gear teeth formed therearound, a pair of actuating rods arranged in a tangential relationship relative to a center axis of said stamper plate attaching and detaching bush and extending in parallel with each other for linearly displacing said stamper plate attaching and detaching bush by rotating one of said actuating rod with an operator's hand, each of said actuating rods including a pinion gear at an end portion thereof to mesh with said rack of said stamper plate attaching and detaching bush, and a lock nut having a plurality of female threads formed therein for immovably holding one of said actuating rod during a series of molding operations.

7. The disc base board molding die according to claim 6, wherein said actuating rods are operatively connected to each other via a pair of gears located outside of said lock nut so that said actuating rods are rotated in opposite direction relative to each other as one of said actuating rods is rotated with an operator's hand.

8. The disc base board molding die according to claim 6, further comprising a die plate integrated with said one die half and having a pair of insert guiding holes each extending parallel with each other therein, said insert guiding holes being formed at a right angle relative to the center axis of said stamper plate attaching and detaching bush and extending tangentially relative to the outer peripheral surface of said stamper plate attaching and detaching bush so as to allow said actuating rods to be slidably displaced in said insert guide holes as one of said actuating rods is rotated with an operator's hand.

9. The disc base board molding die according to claim 8, wherein a respective inner wall of said insert guiding holes includes a plurality of female threads, and a plurality of male threads are formed around each actuating rod in a region substantially corresponding to said female threads of each insert guiding hole and said female threads of said lock nut.

10. The disc base board molding die according to claim 9, wherein the plurality of male threads of one of said actuating rods and the plurality of female threads of one of said insert guiding holes spirally extend in opposite directions relative to the respective plurality of male threads of the other one of said actuating rods and the plurality of female threads of the other one of said insert guiding holes.

11. The disc base board molding die according to claim 6, further comprising a plurality of gears, and a knob, to be seized by an operator's hand, fixedly secured to a foremost end of one of said actuating rods for simultaneously rotating the actuating rods in opposite directions therewith with the aid of said gears.

* * * * *